United States Patent
Chen et al.

(10) Patent No.: US 12,293,531 B2
(45) Date of Patent: May 6, 2025

(54) DEPTH SENSING SYSTEM AND DEPTH SENSING METHOD

(71) Applicant: HIMAX TECHNOLOGIES LIMITED, Tainan (TW)

(72) Inventors: Wu-Feng Chen, Tainan (TW); Ching-Wen Wang, Tainan (TW); Cheng Che Tsai, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 375 days.

(21) Appl. No.: 18/152,741

(22) Filed: Jan. 10, 2023

(65) Prior Publication Data
US 2024/0233152 A1    Jul. 11, 2024

(51) Int. Cl.
*G06K 9/00*    (2022.01)
*G06T 7/50*    (2017.01)
*H04N 25/705*    (2023.01)

(52) U.S. Cl.
CPC ............ *G06T 7/50* (2017.01); *H04N 25/705* (2023.01)

(58) Field of Classification Search
CPC ................................ G06T 7/50; H04N 25/705
See application file for complete search history.

(56) References Cited

U.S. PATENT DOCUMENTS

| | | | |
|---|---|---|---|
| 2016/0187485 A1* | 6/2016 | Wang | G01S 17/48 356/3.01 |
| 2018/0356524 A1* | 12/2018 | Wang | G01S 7/4912 |
| 2022/0011429 A1* | 1/2022 | Wang | G01S 7/4912 |
| 2023/0041814 A1* | 2/2023 | Nicholson | G06T 17/00 |

FOREIGN PATENT DOCUMENTS

| | | | |
|---|---|---|---|
| WO | WO-2021181868 A1 * | 9/2021 | |
| WO | WO-2021238213 A1 * | 12/2021 | G01S 17/10 |

OTHER PUBLICATIONS

A CMOS Time-of-Flight Depth Image Sensor With In-Pixel Background Light Cancellation and Phase Shifting Readout Technique, Tzu-Hsiang Hsu et al., IEEE, 2018, pp. 2898-2905 (Year: 2018).*

(Continued)

*Primary Examiner* — Jayesh A Patel
(74) *Attorney, Agent, or Firm* — CKC & Partners Co., LLC

(57) ABSTRACT

A depth sensing system and a depth sensing method are provided. The sensing system includes depth sensing module and a processor for performing the sensing method. The depth sensing method incudes: obtaining a sensed target data set via a depth sensing module; calculating a period number corresponding to a measuring pixel; and calculating an actual range value or an actual depth of the measuring pixel in accordance with a period number and a range value of the measuring pixel. The step of calculating the period number of the target data set includes: calculating a spatial ratio in accordance with the position values of the pixel of optical center and measuring pixel, and a focal length of the depth sensing module; calculating a basic range in accordance with the spatial ratio and an unit depth; and calculating the period number corresponding to the measuring pixel.

20 Claims, 7 Drawing Sheets

(56) References Cited

OTHER PUBLICATIONS

IToF2dToF: A Robust and Flexible Representation for Data-Driven Time-of-Flight Imaging, Felipe Gutierrez-Barragan et al., IEEE, 2021, pp. 1205-1214 (Year: 2021).*
A New Architecture for TOF-based Range-finding Sensor, David Stoppa et al., IEEE, 2004, pp. 481-484 (Year: 2004).*
Indirect time-of-flight 3D imaging using large-area transmission modulators, Markus Miller et al., SPIE, 2021, pp. 117880G-1 to 117880G-9 (Year: 2021).*

* cited by examiner

DEPTH SENSING SYSTEM AND DEPTH SENSING METHOD

BACKGROUND

Technical Field

The invention relates to a depth sensing system and a depth sensing method, and more particularly to a depth sensing system and a depth sensing method using a modulated light having a single-frequency.

Description of Related Art

An indirect time-of-flight (iToF) module is a conventional device used for sensing a distance from the iToF module to a target object. The iToF module utilizes a lightning projector to emit a modulated light to the target object, and utilize a sensor to receive the modulated light reflected back by the target object. Thus, a distance (i.e., a depth) between the depth sensing module and the target object is calculated according to a phase delay $\varphi$ caused by the back-and-forth flight time of the modulated light.

However, the phase delay $\varphi$ of the modulated light is limited to a period of the modulated light, that is, a measurement range of the phase delay $\varphi$ is limited to $0 \sim 2\pi$. In other words, the depth sensing module cannot distinguish the difference between the phase delay $\varphi$, $2\pi+\varphi$, $4\pi+\varphi$ ... and $2n\pi+\varphi$ corresponding to different periods. Therefore, there is a need for calculation of a period number to which the phase delay $\varphi$ corresponds.

SUMMARY

Thus, the purpose of the invention is to provide a depth sensing system and a depth sensing method using a single-frequency modulated light for calculation of a period number to which the phase delay $\varphi$ corresponds, thereby obtaining the period number to which the phase delay $\varphi$ corresponds and calculating an actual depth/range value in accordance with the period number.

According to the purpose of the invention, a depth sensing method includes: obtaining a sensed target data set via a depth sensing module, wherein the sensed target data set comprises pixel data and corresponding range data, the pixel data include a center position value corresponding to a pixel of optical center of the depth sensing module and a measuring position value corresponding to a measuring pixel of the depth sensing module, and the range data include a range value corresponding to the pixel of optical center and a range value corresponding to the measuring pixel; calculating a period number corresponding to the measuring pixel, wherein calculating the period number of the sensed target data set; and calculating an actual range value or an actual depth of the measuring pixel in accordance with the period number. The step of calculating the period number of the sensed target data set further includes calculating a spatial ratio in accordance with the position value of the pixel of optical center, the position value of the measuring pixel, and a focal length of the depth sensing module; calculating a basic range in accordance with the spatial ratio and an unit depth, wherein the unit depth is the range value of the pixel of optical center; and calculating the period number corresponding to the measuring pixel in accordance with the range value of the measuring pixel, the basic range and a period distance of a single-frequency modulated light, wherein the period number in an integer greater than or equal to zero.

In some embodiments, the depth sensing module further includes a sensor which is a pixel sensor array comprising a plurality of pixels, and the pixels of the pixel sensor array includes the pixel of optical center and the measuring pixel.

In some embodiments, calculating the spatial ratio in accordance with the position value of the pixel of optical center, the position value of the measuring pixel, and the focal length of the depth sensing module is performed in accordance with following equation:

$$r = \sqrt{\left(\frac{(p_x - c_x)}{f}\right)^2 + \left(\frac{(p_y - c_y)}{f}\right)^2 + 1},$$

wherein r is the spatial ratio, (px, py) is the position value of the measuring pixel, (cx, cy) is the position value of the pixel of optical center, and f is the focal length of the depth sensing module.

In some embodiments, calculating the basic range in accordance with the spatial ratio and the unit depth is performed by multiplying the unit depth by the spatial ratio.

In some embodiments, calculating the period number corresponding to the measuring pixel in accordance with the range value of the measuring pixel, the basic range and the period distance of the single-frequency modulated light is performed in accordance with following equation:

$$N = \frac{(R_P - r \times D)}{n \times P},$$

wherein N is the period number, n=r−1, $R_P$ is the range value of the measuring pixel, D is the unit depth and P is the period distance.

In some embodiments, calculating the actual range value or the actual depth of the measuring pixel in accordance with the period number comprises: calculating the actual depth of the measuring pixel in accordance with following equation: $D_A = N \times P + D$, wherein $D_A$ is the actual depth of the measuring pixel, N is the period number, P is the period distance and D is the unit depth.

In some embodiments, calculating the actual range value or the actual depth of the measuring pixel in accordance with the period number further comprises: calculating the actual range value of the measuring pixel in accordance with following equation: $R_A = r \times (N \times P + D)$, wherein $R_A$ is the actual range value of the measuring pixel, r is the spatial ratio, N is the period number, P is the period distance and D is the unit depth.

According to the purpose of the invention, a depth sensing method includes: obtaining a sensed target data set via a depth sensing module, wherein the sensed target data set includes pixel data and corresponding range data, the pixel data include a position value corresponding to a pixel of optical center of the depth sensing module, a measuring position value corresponding to a first measuring pixel of the depth sensing module and a measuring position value corresponding to a second measuring pixel of the depth sensing module, and the range data include a range value corresponding to the pixel of optical center, a range value corresponding to the first measuring pixel, and a range value corresponding to the second measuring pixel; calculating a period number corresponding to the first measuring pixel and the second measuring pixel; calculating an first actual range value and an first actual depth of the first measuring pixel in accordance with the period number; and calculating an second actual range value and an second actual depth of the second measuring pixel in accordance with the period number. The step of calculating the period number corresponding to the first measuring pixel and the second measuring pixel includes calculating a first spatial ratio in accordance with the position value of the pixel of optical center, the position value of the first measuring pixel, and a focal length of the depth sensing module; calculating a first basic range in accordance with the first spatial ratio and an unit depth, wherein the unit depth is a range value of the pixel of optical center; calculating a second spatial ratio in accordance with the position value of the pixel of optical center, the position value of the second measuring pixel, and the focal length of the depth sensing module; calculating a second basic range in accordance with the second spatial ratio and the unit depth; and calculating the period number corresponding to the first measuring pixel and the second measuring pixel in accordance with the range value of the first measuring pixel, the range value of the second measuring pixel, the first basic range, the second basic range, and a period distance of a single-frequency modulated light, wherein the period number in an integer greater than or equal to zero.

In some embodiments, calculating the first spatial ratio and the second spatial ratio are performed in accordance with following equations:

$$r_1 = \sqrt{\left(\frac{(p_{x1}-c_x)}{f}\right)^2 + \left(\frac{(p_{y1}-c_y)}{f}\right)^2 + 1},$$

$$r_2 = \sqrt{\left(\frac{(p_{x2}-c_x)}{f}\right)^2 + \left(\frac{(p_{y2}-c_y)}{f}\right)^2 + 1},$$

wherein $r_1$ is the first spatial ratio, $r_2$ is the second spatial ratio, $(p_{x1}, p_{y1})$ is the position value of the first measuring pixel, $(p_{x2}, p_{y2})$ is the position value of the second measuring pixel, (cx, cy) is the position value of the pixel of optical center, and f is the focal length of the depth sensing module.

In some embodiments, calculating the first basic range in accordance with the first spatial ratio and the unit depth is performed by multiplying the unit depth by the first spatial ratio, and wherein calculating the second basic range in accordance with the second spatial ratio and the unit depth is performed by multiplying the unit depth by the second spatial ratio.

In some embodiments, calculating the period number corresponding to the first measuring pixel and the second measuring pixel in accordance with the range value of the first measuring pixel, the range value of the second measuring pixel, the first basic range, the second basic range, and the period distance of the single-frequency modulated light is performed in accordance with following equation:

$$N = \frac{\left[R_{P1} - \left(\frac{r_2}{r_1}\right) \times R_{P2}\right]}{\left[\frac{(n_2 - n_1)}{1 + n_1}\right] \times P},$$

wherein N is the period number, $n_1 = r_1 - 1$, $n_2 = r_2 - 1$, $R_{P1}$ is the range value of the first measuring pixel, $R_{P2}$ is the range value of the second measuring pixel and P is the period distance.

In some embodiments, calculating the first actual range value or the first actual depth of the first measuring pixel in accordance with the period number comprises: calculating the first actual range value and the first actual depth of the first measuring pixel in accordance with following equations:

$$R_{A1} = N \times P + R_{P1},$$

$$D_{A1} = \frac{R_{A1}}{r_1},$$

wherein $R_{A1}$ is the first actual range of the first measuring pixel, $R_{P1}$ is the range value of the first measuring pixel, N is the period number, P is the period distance, $D_{A1}$ is the first actual depth of the first measuring pixel and $r_1$ is the first spatial ratio.

In some embodiments, calculating the second actual range value or the second actual depth of the second measuring pixel in accordance with the period number comprises: calculating the second actual depth and the second actual depth of the second measuring pixel in accordance with following equation:

$$R_{A2} = N \times P + R_{P2},$$

$$D_{A2} = \frac{R_{A2}}{r_2},$$

wherein $R_{A2}$ is the second actual range value of the second measuring pixel, $R_{P2}$ is the range value of the second measuring pixel, N is the period number, P is the period distance, $D_{A2}$ is the second actual depth of the second measuring pixel and $r_2$ is the second spatial ratio.

According to the purpose of the invention, a depth sensing system includes: a depth sensing module configured to emit a single-frequency modulated light to a target object, and to obtain a sensed target data set in accordance with the first single-frequency modulated light reflected from the target object, wherein the sensed target data set comprises pixel data and corresponding range data, the pixel data comprise a center position value corresponding to a pixel of optical center of the depth sensing module and a measuring position value corresponding to a measuring pixel of the depth sensing module, and the range data include a range value corresponding to the pixel of optical center and a range value corresponding to the measuring pixel; and a processor configured to perform: calculating a period number corresponding to the measuring pixel, wherein calculating the period number corresponding to the measuring pixel; and calculating an actual range value or an actual depth of the measuring pixel in accordance with the period number. The step of calculating the period number corresponding to the measuring pixel includes: calculating a spatial ratio in accordance with the position value of the pixel of optical center, the position value of the measuring pixel, and a focal length of the depth sensing module; calculating a basic range in accordance with the spatial ratio and an unit depth, wherein the unit depth is a range value of the pixel of optical center; and calculating the period number corresponding to the measuring pixel in accordance with the range value of the measuring pixel, the basic range and a period distance of the single-frequency modulated light, wherein the period number in an integer greater than or equal to zero.

In some embodiments, the sensor is a pixel sensor array comprising a sensor which is a pixel sensor array comprising a plurality of pixels, and the pixels of the pixel sensor array comprises the pixel of optical center and the measuring pixel.

In some embodiments, calculating the spatial ratio in accordance with the position value of the pixel of optical center, the position value of the measuring pixel, and the focal length of the depth sensing module is performed in accordance with following equation:

$$r = \sqrt{\left(\frac{(p_x - c_x)}{f}\right)^2 + \left(\frac{(p_y - c_y)}{f}\right)^2 + 1},$$

wherein r is the spatial ratio, (px, py) is the position value of the measuring pixel, (cx, cy) is the position value of the pixel of optical center, and f is the focal length of the depth sensing module.

In some embodiments, calculating the basic range in accordance with the spatial ratio and the unit depth is performed by multiplying the unit depth by the spatial ratio.

In some embodiments, calculating the period number corresponding to the measuring pixel in accordance with the range value of the measuring pixel, the basic range and the period distance of the single-frequency modulated light is performed in accordance with following equation:

$$N = \frac{(R_P - r \times D)}{n \times P},$$

wherein N is the period number, n=r−1, $R_P$ is the range value of the measuring pixel, D is the unit depth and P is the period distance.

In some embodiments, calculating the actual range value or the actual depth of the measuring pixel in accordance with the period number and the range value of the measuring pixel comprises: calculating the actual depth of the measuring pixel in accordance with following equation: $D_A$=N×P+D, wherein $D_A$ is the actual depth of the measuring pixel, N is the period number, P is the period distance and D is the unit depth.

In some embodiments, calculating the actual range value or the actual depth of the measuring pixel in accordance with the period number comprises: calculating the actual range value of the measuring pixel in accordance with following equation: $R_A$=r×(N×P+D), wherein $R_A$ is the actual range value of the measuring pixel, r is the spatial ratio, N is the period number, P is the period distance and D is the unit depth.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form.

The using of "first", "second", "third", etc. in the specification should be understood for identifying units or data described by the same terminology but are not referred to particular order or sequence.

Figure 1:
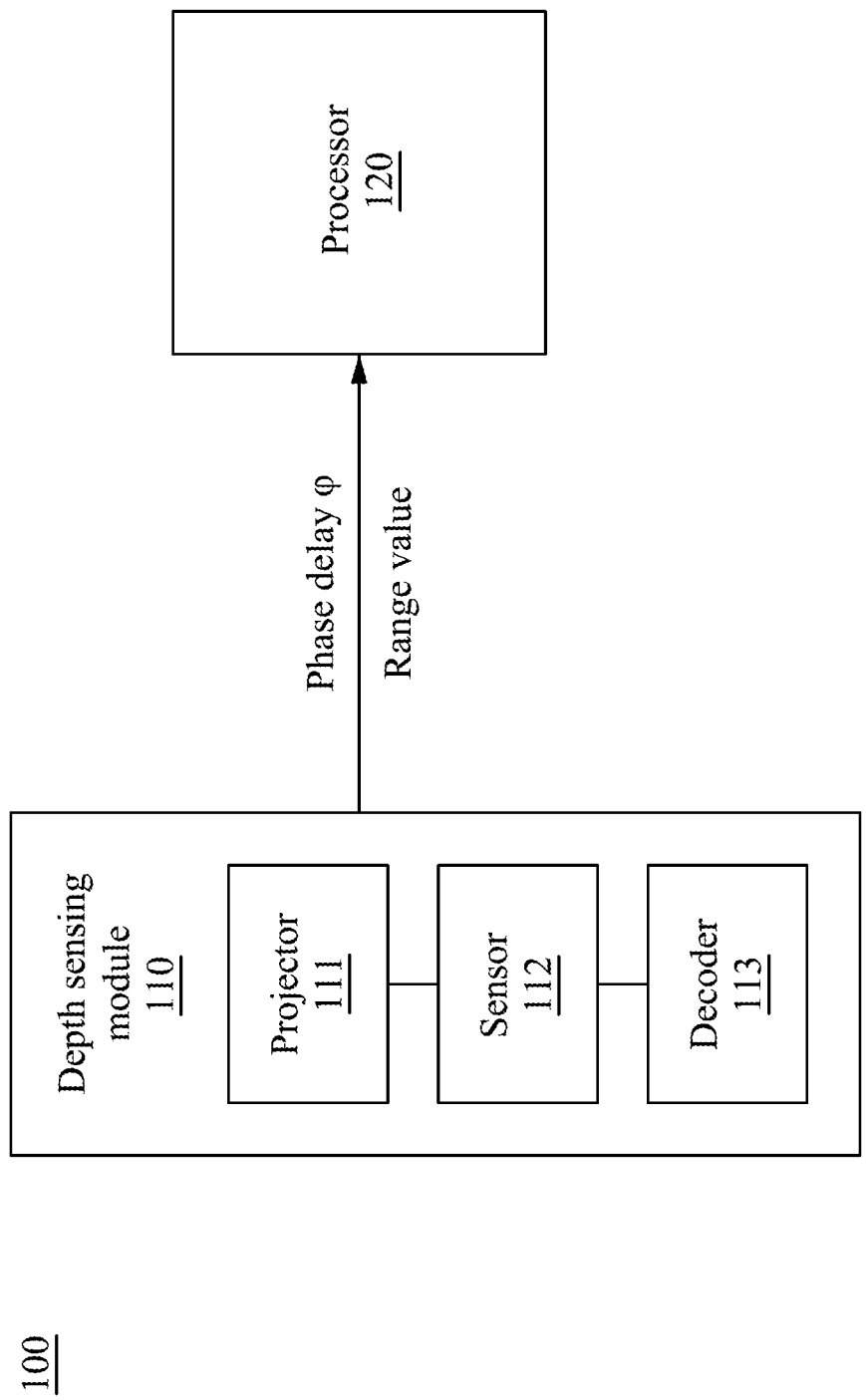
FIG. 1 is a schematic diagram of a depth sensing system in accordance with some embodiments of the invention.

FIG. 1 is a schematic diagram of a sensing system 100 in accordance with some embodiments of the invention. The sensing system 100 includes a depth sensing module 110 and a processor 120. The depth sensing module 110 is electrically connected to the processor 120 to perform depth sensing. The depth sensing module 110 includes a projector 111 for projecting modulated lights and a sensor 112 for receiving modulated lights reflected from a target object. The processor 120 is configured to perform processes including spatial de-aliasing and actual range value/depth calculation based on the modulated lights received by the depth sensing module 110.

In the embodiments of the invention, the projector 111 is a light projector, and the modulated lights emitted by the projector 111 may be laser diodes, light emitting diodes (LED), edge emitting lasers (EEL), or vertical cavity surface emitting lasers (VCSEL), or other types of light emitting units. The modulated lights may be a continuous square wave or a continuous sine wave, or other continuous waves that are generated periodically. In the embodiments of the invention, the modulated lights emitted by the projector 111 are modulated lights with a single-frequency.

In the embodiments of the invention, the sensor 112 is an image sensor which converts the received modulated lights into electrical signals. The sensor 112 is a pixel sensor array including a plurality of pixels, which may be a complementary metal oxide semiconductor (CMOS), a charge coupled device (CCD), an avalanche diode (AD), a single photon avalanche diode (SPAD), and similar photosensitive elements. The sensor 112 receives the modulated light reflected from the target object and obtains pixel data of all the pixels.

In the embodiments of the invention, the processor 120 may include one or more processing circuits or modules, such as central processing unit (CPU), general purpose microprocessor, microcontroller (MCU), digital signal processor (DSP), field programmable gate array (FPGA), programmable logic device (PLD), controller, state machine, or any other suitable combination of circuits, devices and/or structures capable of performing computations or data processing.

In the embodiments of the invention, the depth sensing module 110 further includes a decoder 113 to perform the phase decoding. A phase delay φ is generated between the modulated light received from the sensor 112 and the modulated light emitted from the projector 111, and the phase delay φ is related to the depth between the target object and the depth sensing module 110. In addition, a range data may be obtained in accordance with the phase delay q. The range data include range values corresponding to the all the pixels of the depth sensing module 110.

Figure 2:
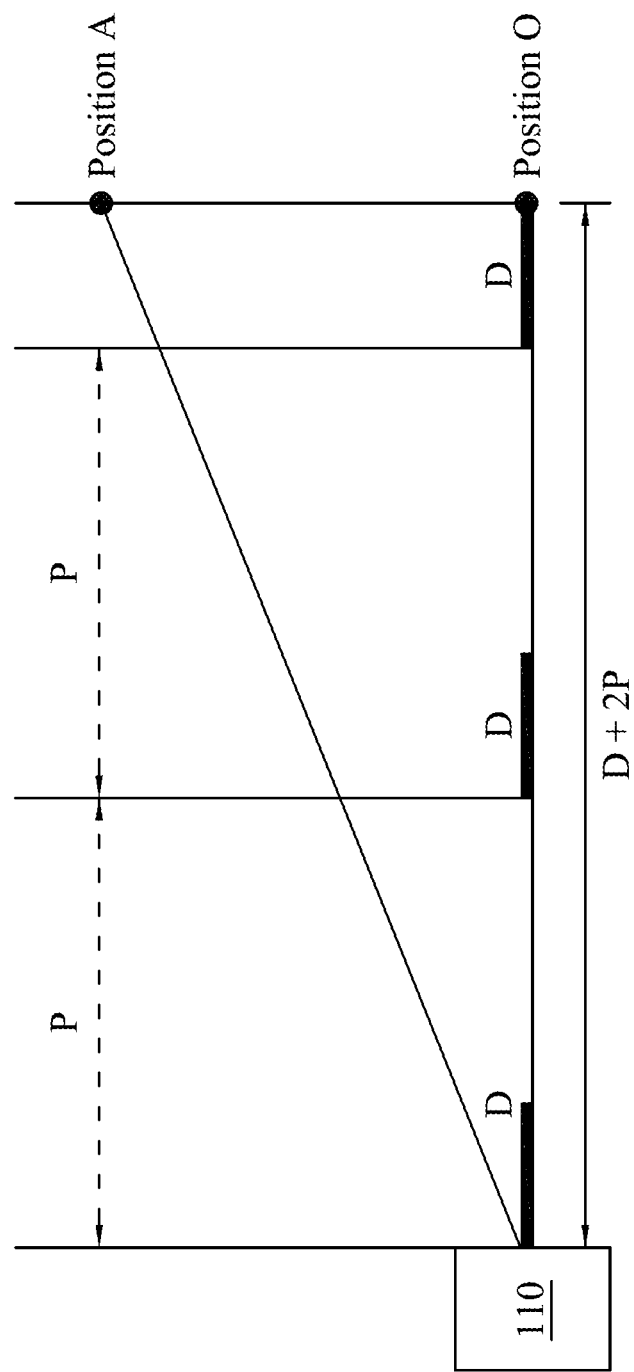
FIG. 2 is a schematic diagram showing a desired positon A on the target object according to an embodiment of the invention.

Referring to FIG. 2, FIG. 2 is a schematic diagram showing a desired positon A on the target object according to an embodiment of the invention. The desired positon A corresponds to a measuring pixel among the pixels of the sensor 112, and an optical center position O corresponds to a pixel of optical center among the pixels of the sensor 112. The pixel of optical center is pixel corresponding to a lens center (i.e. the optical center or a camera center) corresponds to the sensor 112. In some embodiments, the pixel of optical center is a pixel center of the pixels of the depth sensing module 110. In this case, the depth sensing module 110 may output a range value of the desired positon A, a range value of the optical center position O and a corresponding phase delay φ. However, in order to calculate an actual range value and an actual depth of the desired positon A/ optical center position O, a calculation for period number is required to obtain a period number N corresponding to the desired positon A/ optical center position O since a distance between the sensor 112 and the desired positon A/ optical center position O is greater than a period distance P (corresponding to a phase of 2π). For example, an actual depth of the optical center position O is D+2P, where D is the range value of the optical center position O outputted by the depth sensing module 110, the number 2 is the period number N, and the period number N is an integer greater than or equal to zero.

In the embodiments of the invention, the processor 120 is configured to perform the spatial de-aliasing for calculating the period number N corresponding to the measuring pixel. The calculation for the period number N is performed in accordance with the range value of the measuring pixel, a basic range and the period distance P of the single-frequency modulated light, thereby obtaining the actual range value $R_A$ and the actual depth $D_A$. The basic range is calculated in accordance with a spatial ratio r and a unit depth, in which the spatial ratio r is calculated in accordance with the position value of the pixel of optical center, the position value of the measuring pixel, and a focal length f of the depth sensing module 110. The unit depth is the range value of the pixel of optical center.

Figure 3:
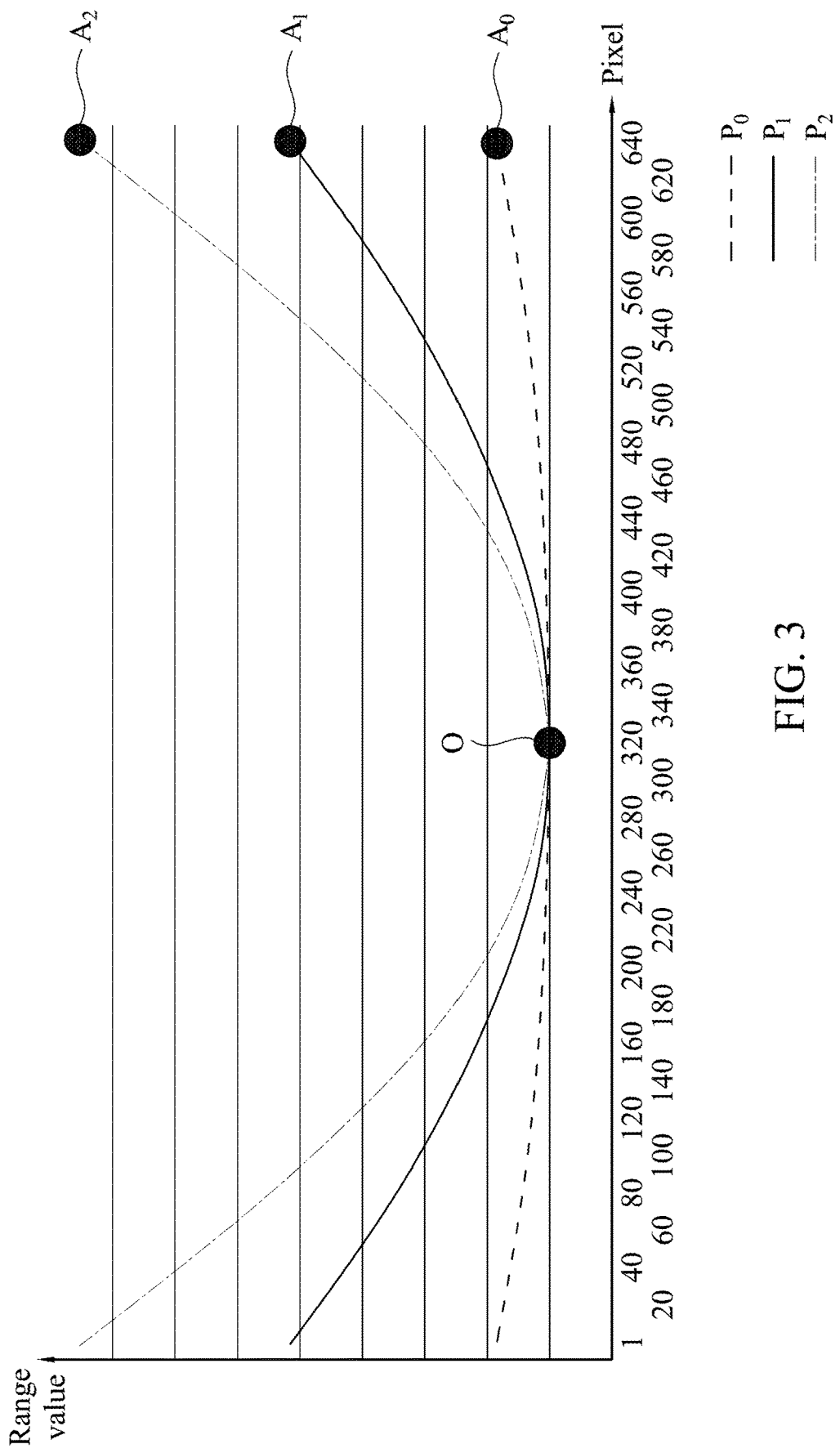
FIG. 3 is a schematic diagram of the relationship between the period number of measuring pixels and the range value and the pixel obtained by the depth sensing module according to an embodiment of the invention.

As mentioned above, the actual range value $R_A$ and the actual depth $D_A$ can be obtained by the period number N. Therefore, the relationship between the period number N of measuring pixels and the range value and the pixel obtained by the depth sensing module is shown in FIG. 3. In order to clearly show the relationship between range data and different period numbers of the measuring pixel A, the measuring pixel A in the first period $P_0$ (period number N=0) is expressed as $A_0$, the measuring pixel A in the second period $P_1$ (period number N=1) is expressed as $A_1$, the measuring pixel A in the third period $P_2$ (period number N=2) is expressed as $A_2$. O is a pixel of optical center, and if the measuring pixel A is located in the first period $P_0$ (A=$A_0$), the range value of the measuring pixel $A_0$ obtained by the depth sensing module 110 is relatively small; if the measuring pixel A is located in the second period $P_1$ (A=$A_1$), the range value of the measuring pixel $A_1$ obtained by the depth sensing module 110 is larger; if the measuring pixel A is located in the third period $P_2$ (A=$A_2$), the range value of the measuring pixel $A_2$ obtained by the depth sensing module 110 is larger the above two. It can be seen that the range value has a positive relationship with the period number N, and the range value becomes larger as the period number N increases. Therefore, a range value obtained by the depth sensing module 110 may be analyzed by using the positive relationship between the range value and the period number N, and the period number N can be calculated to obtain the actual range value $R_A$ and the actual depth $D_A$. Although only three measuring pixels (A=$A_1$, $A_2$ or $A_3$) and the period numbers (N=1, 2 or 3) are shown in FIG. 3, in fact, more period numbers also have the positive relationship with range value.

In the embodiments of the invention, the processor 120 is configured to perform the actual range value or the actual depth calculation. After obtaining the period number N, the actual range value and the actual depth may be calculated.

Figure 4:
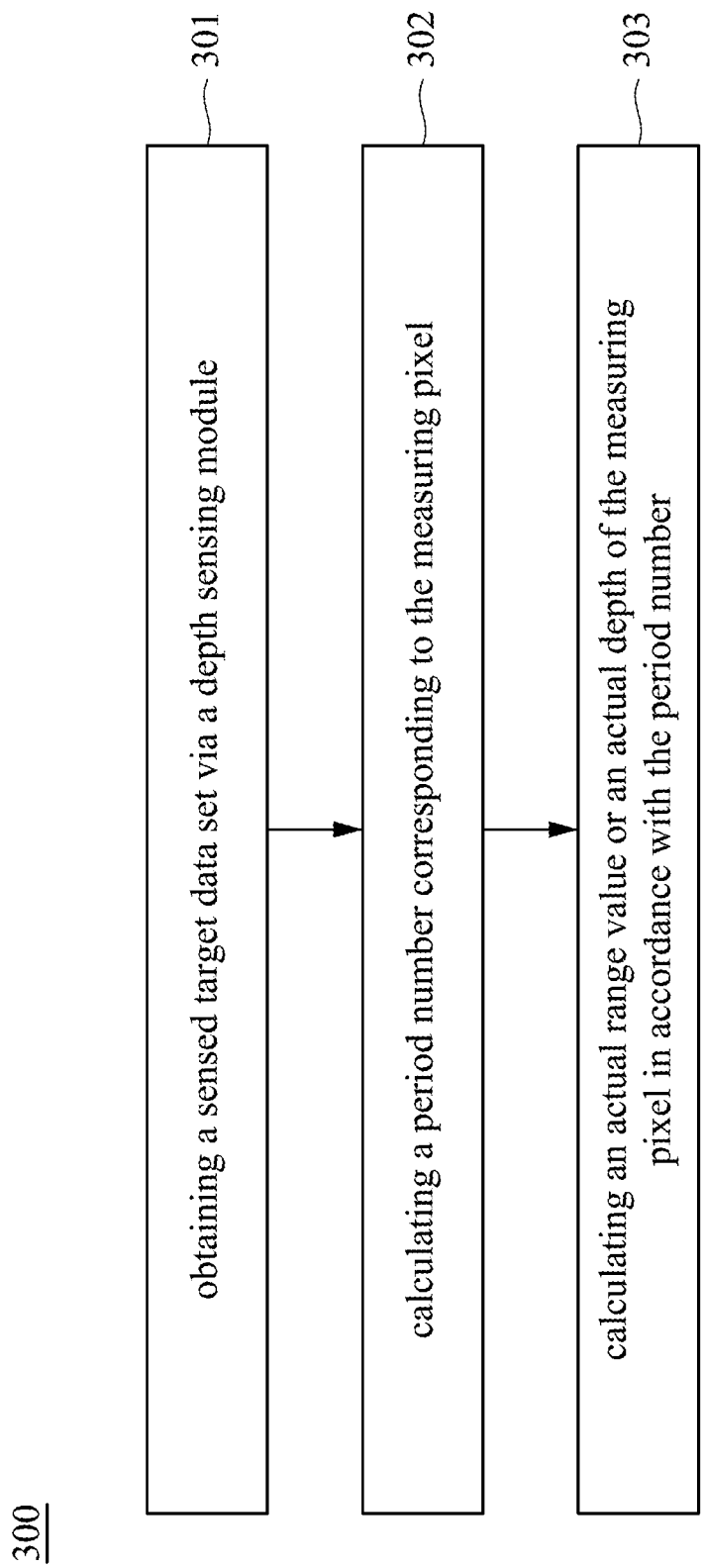
FIG. 4 is a flowchart of a depth sensing method in accordance with an embodiment of the invention.

FIG. 4 is a flowchart of a sensing method 300 in accordance with an embodiment of the invention. The method 300 may be applied to the configuration shown in FIG. 1 or another similar configuration. The following takes the configuration shown in FIG. 1 as an example for description. The method 300 for calculating depth with single-frequency and spatial de-aliasing includes step 301 to 303. In step 301, the depth sensing module 110 is configured to obtain a sensed target data set. The single-frequency modulated light is emitted to a target object, and to obtain the sensed target data set in accordance with the single-frequency modulated light reflected from the target object. The target data set includes pixel data and corresponding range data, the pixel data include an optical center position value corresponding to a pixel of optical center O of the depth sensing module and a measuring position value corresponding to a measuring pixel M of the depth sensing module 110, and the range data include a range value corresponding to the pixel of optical center O and a range value $R_P$ corresponding to the measuring pixel M. The single-frequency modulated light is a light source with a single-frequency. The target object may be a plane or a three dimensional object. In the embodiment of the invention, an application distance exceeding one period can be achieved by using the modulated light with the single-frequency.

After performing step 301, step 302 is performed to calculate a period number N corresponding to the measuring pixel M. Based on the application distance limitation as mentioned above, the phase delay φ is only limited to 0~2π, it is necessary to know the period number N in which the measuring pixel M is located, thereby calculating an actual range value $R_A$ and an actual depth $D_A$. The sensor 112 of the depth sensing module 110 is a pixel sensor array includes a plurality of pixels and each of the plurality of pixels have an actual range value and an actual depth, in which the measuring pixel M is one of the plurality of pixels of the sensor 112.

Figure 5:
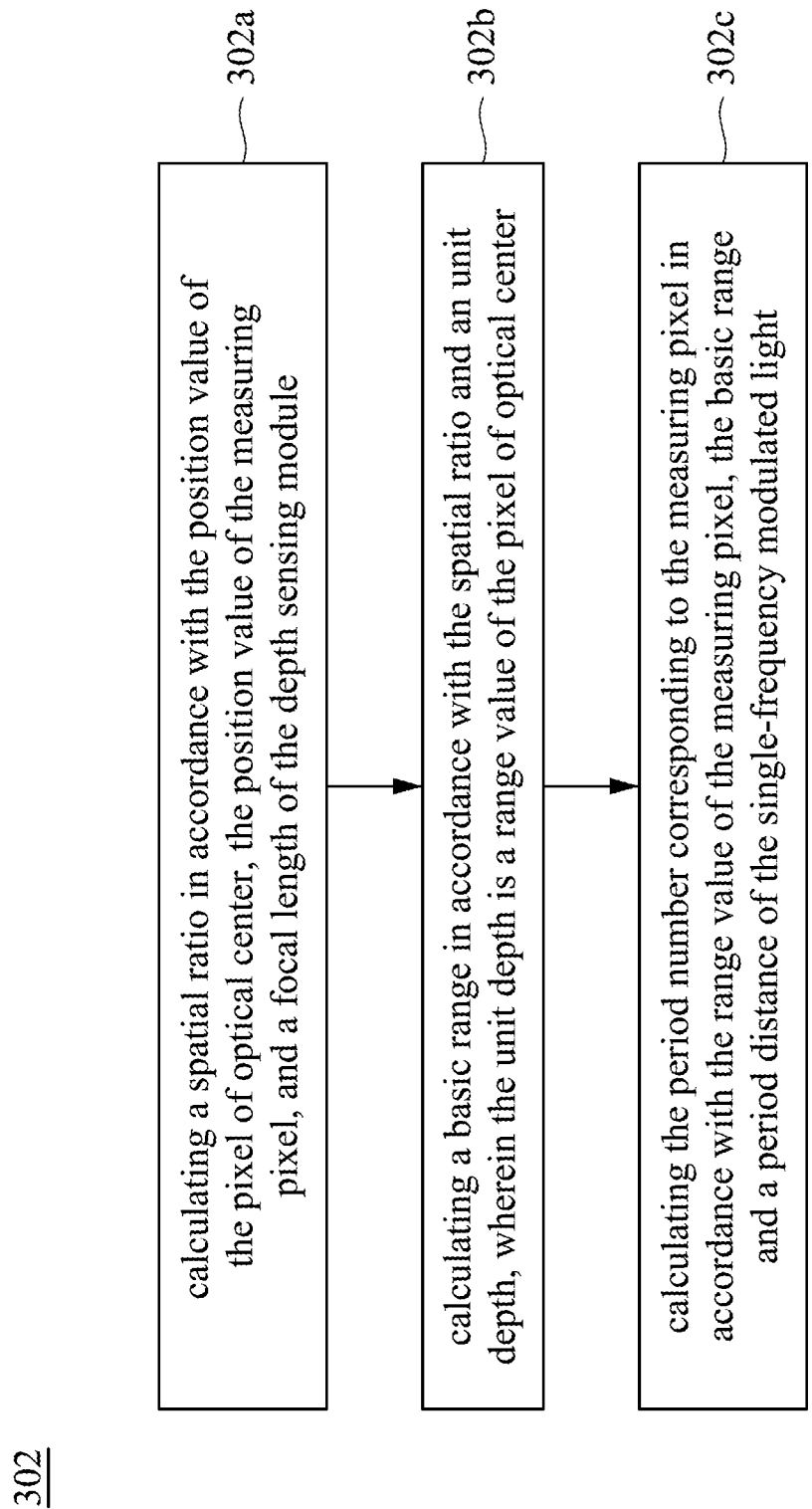
FIG. 5 is a flowchart of step for calculating the period number of the measuring pixel in accordance with an embodiment of the invention.

In step 302, steps 302a to 302c further included to obtain the period number N of the measuring pixel M. Referring to FIG. 5, step 302a is performed to calculate a spatial ratio r in accordance with the position value of the pixel of optical center O, the position value of the measuring pixel M, and a focal length f of the depth sensing module 110 first. The spatial ratio r is a proportional relationship between the actual range $R_A$ and the actual depth $D_A$, which can be calculated through the position value of the pixel of optical center O, the position value of the measuring pixel M, and the focal length f of the depth sensing module 110, which can be expressed as equation (1):

$$r = \sqrt{\left(\frac{(p_x - c_x)}{f}\right)^2 + \left(\frac{(p_y - c_y)}{f}\right)^2 + 1}, \quad (1)$$

where $(p_x, p_y)$ is position value of the measuring pixel M, and (cx, cy) is the position value of the pixel of optical center O. f is the focal length of the sensor lens (not shown).

In step 302b, the basic range is calculated in accordance with the spatial ratio r and the unit depth D, in which the unit depth D is the range value of the pixel of optical center O. The basic range is performed by multiplying the unit depth D and the spatial ratio r.

In step 302c, the period number N corresponding to the measuring pixel M is calculated in accordance with the range value $R_P$ of the measuring pixel M, the basic range and the period distance P of the single-frequency modulated light. The period distance P is a maximum distance that can be measured of the single-frequency modulated light. Specifically, the maximum distance that can be obtained in phase $2\pi$ is the period distance P. The relationship of the period number N derived from the basic range r×D, the period distance P and the range value $R_P$ of the measuring pixel M can be expressed as equation (2):

$$N = \frac{(R_P - r \times D)}{n \times P}, \quad (2)$$

wherein n is the coefficient decomposed by the spatial ratio r, and can be expressed as r=1+n. According to the equation (1) and equation (2), the period number N of the measuring pixel M can be obtained.

After performing step 302, step 303 is performed to calculate the actual range value $R_A$ or the actual depth $D_A$ of the measuring pixel M in accordance with the period number N and the range value $R_P$ of the measuring pixel M. The actual range value $R_A$ and the actual depth $D_A$ of the measuring pixel M can be expressed as equation (3) and equation (4) respectively:

$$R_A = r \times (N \times P + D) = N \times P + R_P \quad (3)$$

$$D_A = N \times P + D \quad (4)$$

In the embodiment of the invention, the position value of the pixel of optical center O is (320,240), the focal length f of the depth sensing module 110 is 510, and the period distance P is 2500 mm. A position value of the measuring pixel M is (640, 480), and the range value $R_P$ of the measuring pixel M and the unit depth D are 2116.995 mm and 600 mm, respectively. The spatial ratio r and the coefficient n can be obtained by equations (1), which are 1.2708 and 0.2708, respectively. Finally, the period number N obtained by substituting the parameters into equation (2) is 2, which means that the range value $R_P$ of the measuring pixel M and the unit depth D are located in the second period. Therefore, the actual range value $R_A$ and the actual depth $D_A$ can be calculated by equation (3) and equation (4).

Figure 6:
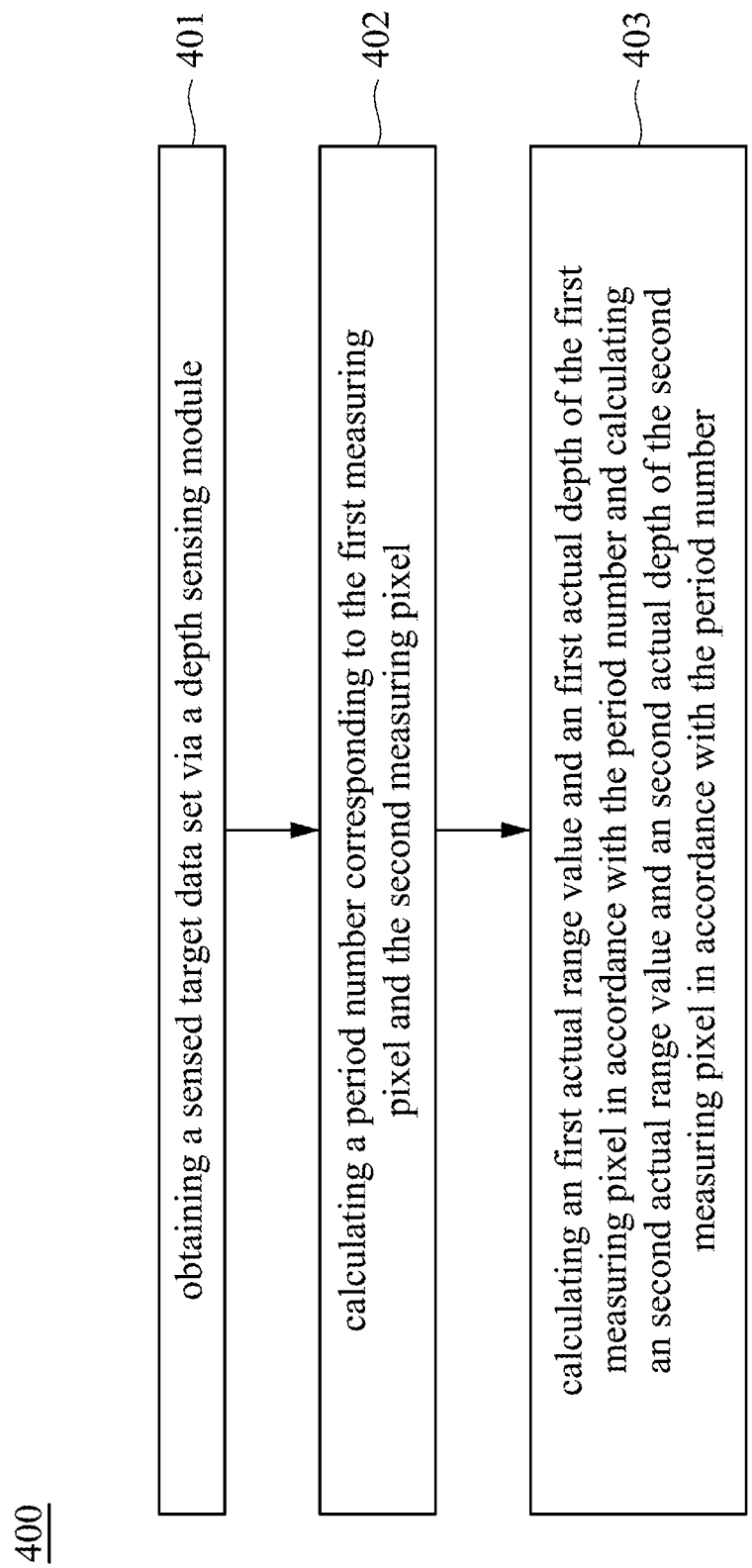
FIG. 6 is a flowchart of a depth sensing method in accordance with an embodiment of the invention.

FIG. 6 is a flowchart of a sensing method 400 in accordance with an embodiment of the invention. The sensing method 400 may be applied to the configuration shown in FIG. 1 or another similar configuration. The following takes the configuration shown in FIG. 1 as an example for description. The method 400 for calculating depth with single-frequency and spatial de-aliasing includes step 401 to 403. In step 401, the depth sensing module 110 is configured to obtain a sensed target data set. The target data set includes pixel data and corresponding range data, the pixel data include a position value corresponding to a pixel of optical center O of the depth sensing module 110, a measuring position value corresponding to a first measuring pixel $M_1$ of the depth sensing module 110 and a measuring position value corresponding to a second measuring pixel $M_2$ of the depth sensing module 110, and the range data comprise a range value corresponding to the pixel of optical center O, a range value $R_{P1}$ corresponding to the first measuring pixel $M_1$, and a range value $R_{P2}$ corresponding to the second measuring pixel $M_2$. The single-frequency modulated light is a light source with a single-frequency. In the embodiment of the invention, the first measuring pixel $M_1$ and the second measuring pixel $M_2$ are taken as an example to calculate the depths, the target data set may actually include many measuring pixels. Specifically, the depths can be calculated from any two measuring pixels, in which the depths of the two measuring pixels are located in the same period and have the same period number N. It should understand that the actual range values and the actual depths of the first measuring pixel $M_1$ and the second measuring pixel $M_2$ can also obtained by using the method 300 in the embodiment of the present invention, for example, by substituting relevant parameters of the first measuring pixel $M_1$ or the second measuring pixel $M_2$ into the equation (1) to equation (4), respectively.

After performing step 401, step 402 is performed to calculate a period number N corresponding to the first measuring pixel $M_1$ and the second measuring pixel $M_2$. Based on the application distance limitation as mentioned above, the phase delay φ is only limited to 0~$2\pi$, it is necessary to know the period number N in which the first measuring pixel $M_1$ and the second measuring pixel $M_2$ is located, thereby calculating the actual range values and the actual depths of the first measuring pixel $M_1$ and the second measuring pixel $M_2$. The sensor 112 of the depth sensing module 110 is a pixel sensor array includes a plurality of pixels and the first measuring pixel $M_1$ is one of the plurality of pixels of the sensor 112, and the second measuring pixel $M_2$ is another one of the plurality of pixels of the sensor 112, in which each of the pixels can obtain an actual range value and an actual depth, for example, the first measuring pixel $M_1$ can obtain a first actual range value $R_{A1}$ and a first actual depth $D_{A1}$ and the second measuring pixel $M_2$ can obtain a second actual range value $R_{A2}$ a second actual depth $D_{A2}$.

Figure 7:
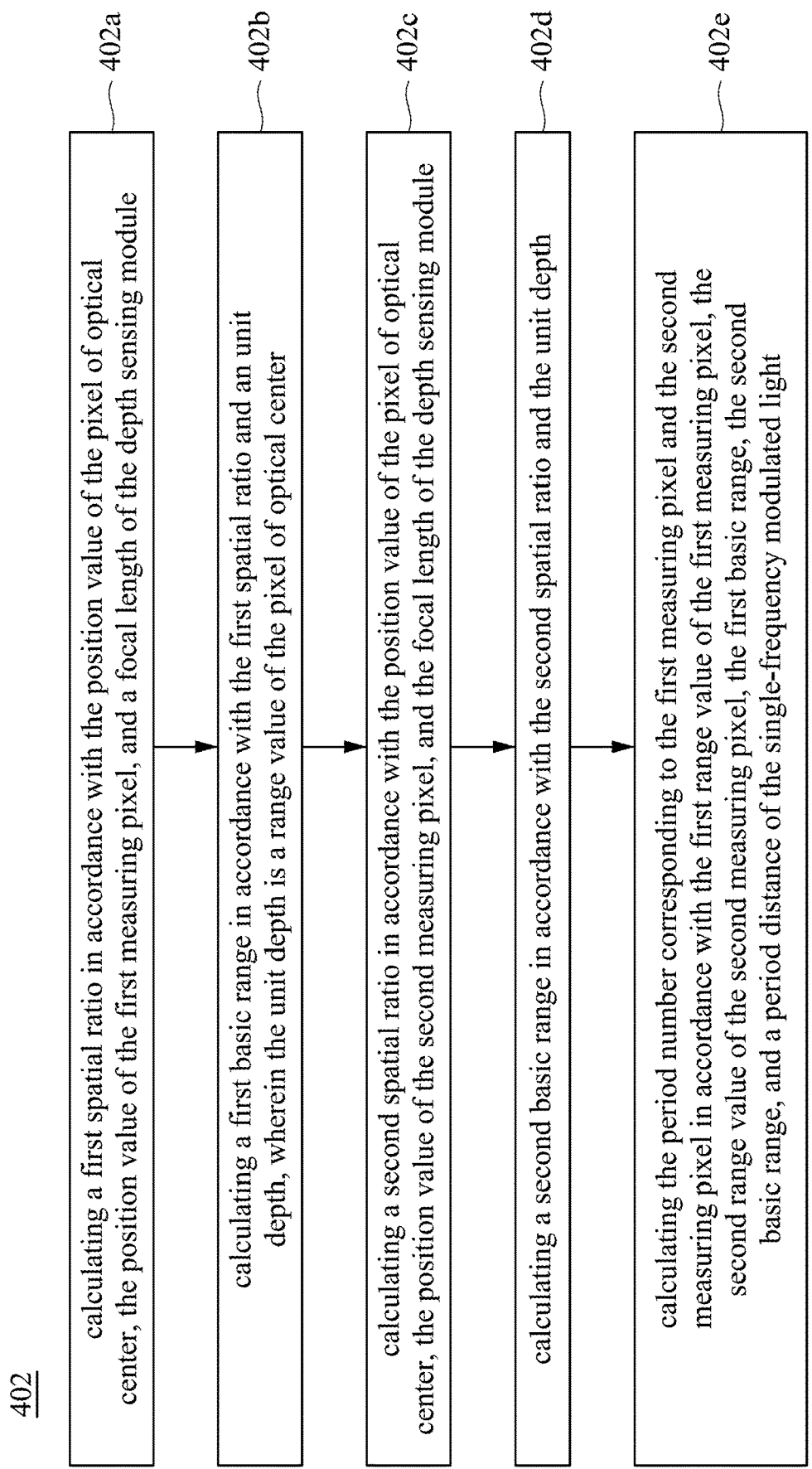
FIG. 7 is a flowchart of step for calculating the period number of the first measuring pixel and the second measuring pixel in accordance with an embodiment of the invention.

In step 402, steps 402a to 402e further included to obtain the period number N of the first measuring pixel $M_1$ and the second measuring pixel $M_2$. Referring to FIG. 7, step 402a is performed to calculate a first spatial ratio $r_1$ in accordance with the position value of the pixel of optical center O, the position value of the first measuring pixel $M_1$ and a focal length f of the depth sensing module 110 first. The first spatial ratio $r_1$ is the proportional relationship between the first actual range value $R_{A1}$ and the first actual depth $D_{A1}$, which can be calculated through the position value of the first measuring pixel $M_1$, the position value of the pixel of optical center O and the focal length f of the depth sensing module 110. The first spatial ratio $r_1$ can be obtained by equation (1), so it is not repeated here.

In step 402b, a first basic range is calculated in accordance with the first spatial ratio $r_1$ and the unit depth D, wherein the unit depth D is the range value of the pixel of optical center O. The first basic range is performed by multiplying the unit depth D and the first spatial ratio $r_1$.

In step 402c, a second spatial ratio $r_2$ is calculated in accordance with the position value of the pixel of optical center O, the position value of the second measuring pixel $M_2$ and the focal length f of the depth sensing module 110. The second spatial ratio $r_2$ is the proportional relationship between the second actual range value $R_{A2}$ and the second actual depth $D_{A2}$, which can be calculated through the position value of the second measuring pixel $M_2$, the position value of the pixel of optical center O and the focal length f of the depth sensing module 110. The second spatial ratio $r_2$ can be obtained by equation (1), so it is not repeated here.

In step 402d, a second basic range is calculated in accordance with the second spatial ratio $r_2$ and the unit depth D, wherein the unit depth D is the range value of the pixel of optical center O. The first basic range is performed by multiplying the unit depth D and the second spatial ratio $r_2$.

In step 402e, the period number N corresponding to the first measuring pixel $M_1$ and the second measuring pixel $M_2$ is calculated in accordance with the first range value $R_{P1}$ of the first measuring pixel $M_1$, the second range value $R_{P2}$ of the second measuring pixel $M_2$, the first basic range, the second basic range and a period distance P of the single-frequency modulated light. The relationship of the period number N derived from the first range value $R_{P1}$ of the first measuring pixel $M_1$, the second range value $R_{P2}$ of the second measuring pixel $M_2$, the first basic range, the second basic range and the period distance P of the single-frequency modulated light can be expressed as equation (5):

$$N = \frac{\left[R_{P1} - \left(\frac{r_2}{r_1}\right) \times R_{P2}\right]}{\left[\frac{(n_2 - n_1)}{1 + n_1}\right] \times P} \quad (5)$$

In the equation (5), $n_1$ and $n_2$ are the coefficients decomposed by the first spatial ratio $r_1$ and the second spatial ratio $r_2$, respectively, and where $n_1 = r_1 - 1$ and $n_2 = r_2 - 1$. The period distance P is the maximum distance that can be measured of single-frequency modulated light in one period. Specifically, the maximum distance that can be obtained in phase $2\pi$ is the period distance P.

After performing step 402, step 403 is performed to calculate the first actual range value $R_{A1}$ or the first actual depth $D_{A1}$ of the first measuring pixel $M_1$ and the second actual range value $R_{A2}$ or the second actual depth $D_{A2}$ of the second measuring pixel $M_2$ in accordance with the period number N, the first range value $R_{P1}$ of the first measuring pixel $M_1$ and the second range value $R_{P2}$ of the second measuring pixel $M_2$. The first actual range value $R_{A1}$ of the first measuring pixel $M_1$ and the second actual range value $R_{A2}$ of the second measuring pixel $M_2$ can be calculated by using equation (6) and the first actual depth $D_{A1}$ of the first measuring pixel $M_1$ and the second actual depth $D_{A2}$ of the second measuring pixel $M_2$ can be calculated by using equation (7) respectively:

$$R_A = N \times P + R_P \quad (6)$$

$$D_A = \frac{R_A}{r} \quad (7)$$

In this embodiment of the invention, the position value of the pixel of optical center O is (320,240), the focal length f of the depth sensing module 110 is 510, and the period distance P is 2500 mm. The position value of the first measuring pixel $M_1$ is (620, 465), the position value of the second measuring pixel $M_2$ is (640, 480), and the first range value $R_{P1}$ of the first measuring pixel $M_1$ and the second range value $R_{P2}$ of the second measuring pixel $M_2$ are 1950.9 mm and 2116.995 mm, respectively. The first spatial ratio $r_1$ and the second spatial ratio $r_2$ can be obtained by equation (1), which are 1.2412 and 1.2708, respectively. The coefficients $n_1$ and $n_2$ are 0.2412 and 0.2708, respectively. Finally, the period number N obtained by substituting the parameters into equation (5) is 2, which means that the first range value $R_{P1}$ of the first measuring pixel $M_1$ and the second range value $R_{P2}$ of the second measuring pixel $M_2$ are located in the second period. Therefore, the first actual range value $R_{A1}$ can be calculated by equation (6) ($R_{A1} = R_{P1} + 2P$), and the first actual depth $D_{A1}$ can be calculated by using equation (7) ($D_{A1} = R_{A1}/r_1$). The second actual range value $R_{A2}$ can be calculated by equation (6) ($R_{A2} = R_{P2} + 2P$), and the second actual depth $D_{A2}$ can be calculated by using equation (7) ($D_{A2} = R_{A2}/r_2$).

The descriptions are only preferred embodiments of the invention as mentioned above, and should not limit the scope of implementation of the invention. That is, any simple equivalent changes and modifications made according to the scope of the claim and the contents of the description of the invention are still within the scope of the claim of the present invention.

What is claimed is:

1. A depth sensing method, comprising:
    obtaining a sensed target data set via a depth sensing module, wherein the sensed target data set comprises pixel data and corresponding range data, the pixel data comprise a position value corresponding to a pixel of optical center of the depth sensing module and a measuring position value corresponding to a measuring pixel of the depth sensing module, and the range data comprise a range value corresponding to the pixel of optical center and a range value corresponding to the measuring pixel;
    calculating a period number corresponding to the measuring pixel, wherein calculating the period number of the sensed target data set comprising:
    calculating a spatial ratio in accordance with the position value of the pixel of optical center, the measuring position value of the measuring pixel, and a focal length of the depth sensing module;
    calculating a basic range in accordance with the spatial ratio and an unit depth, wherein the unit depth is the range value of the pixel of optical center; and
    calculating the period number corresponding to the measuring pixel in accordance with the range value of the measuring pixel, the basic range and a period distance of a single-frequency modulated light, wherein the period number in an integer greater than or equal to zero; and
    calculating an actual range value or an actual depth of the measuring pixel in accordance with the period number.

2. The depth sensing method of claim 1, wherein the depth sensing module further comprises a sensor which is a pixel sensor array comprising a plurality of pixels, and the plurality of pixels of the pixel sensor array comprises the pixel of optical center and the measuring pixel.

3. The depth sensing method of claim 1, wherein calculating the spatial ratio in accordance with the position value of the pixel of optical center, the measuring position value of the measuring pixel, and the focal length of the depth sensing module is performed in accordance with following equation:

$$r = \sqrt{\left(\frac{(p_x - c_x)}{f}\right)^2 + \left(\frac{(p_y - c_y)}{f}\right)^2 + 1}$$

wherein r is the spatial ratio, (px, py) is the measuring position value of the measuring pixel, (cx, cy) is the position value of the pixel of optical center, and f is the focal length of the depth sensing module.

4. The depth sensing method of claim 3, wherein calculating the basic range in accordance with the spatial ratio and the unit depth is performed by multiplying the unit depth by the spatial ratio.

5. The depth sensing method of claim 4, wherein calculating the period number corresponding to the measuring pixel in accordance with the range value of the measuring pixel, the basic range and the period distance of the single-frequency modulated light is performed in accordance with following equation:

$$N = \frac{(R_P - r \times D)}{n \times P}$$

wherein N is the period number, n=r−1, $R_P$ is the range value of the measuring pixel, D is the unit depth and P is the period distance.

6. The depth sensing method of claim 5, wherein calculating the actual range value or the actual depth of the measuring pixel in accordance with the period number comprises:
calculating the actual depth of the measuring pixel in accordance with following equation:

$$D_A = N \times P + D$$

wherein $D_A$ is the actual depth of the measuring pixel, N is the period number, P is the period distance and D is the unit depth.

7. The depth sensing method of claim 5, wherein calculating the actual range value or the actual depth of the measuring pixel in accordance with the period number further comprises:
calculating the actual range value of the measuring pixel in accordance with following equation:

$$R_A = r \times (N \times P + D)$$

wherein $R_A$ is the actual range value of the measuring pixel, r is the spatial ratio, N is the period number, P is the period distance and D is the unit depth.

8. A depth sensing method, comprising:
obtaining a sensed target data set via a depth sensing module, wherein the sensed target data set comprises pixel data and corresponding range data, the pixel data comprise a position value corresponding to a pixel of optical center of the depth sensing module, a measuring position value corresponding to a first measuring pixel of the depth sensing module and a measuring position value corresponding to a second measuring pixel of the depth sensing module, and the range data comprise a range value corresponding to the pixel of optical center, a range value corresponding to the first measuring pixel, and a range value corresponding to the second measuring pixel;
calculating a period number corresponding to the first measuring pixel and the second measuring pixel, wherein calculating the period number corresponding to the first measuring pixel and the second measuring pixel comprises:
calculating a first spatial ratio in accordance with the position value of the pixel of optical center, the measuring position value of the first measuring pixel, and a focal length of the depth sensing module;
calculating a first basic range in accordance with the first spatial ratio and an unit depth, wherein the unit depth is the range value of the pixel of optical center;
calculating a second spatial ratio in accordance with the position value of the pixel of optical center, the measuring position value of the second measuring pixel, and the focal length of the depth sensing module;
calculating a second basic range in accordance with the second spatial ratio and the unit depth; and
calculating the period number corresponding to the first measuring pixel and the second measuring pixel in accordance with the range value of the first measuring pixel, the range value of the second measuring pixel, the first basic range, the second basic range, and a period distance of a single-frequency modulated light, wherein the period number in an integer greater than or equal to zero;
calculating a first actual range value and a first actual depth of the first measuring pixel in accordance with the period number; and
calculating a second actual range value and a second actual depth of the second measuring pixel in accordance with the period number.

9. The depth sensing method of claim 8, wherein calculating the first spatial ratio and the second spatial ratio are performed in accordance with following equations:

$$r_1 = \sqrt{\left(\frac{(p_{x1} - c_x)}{f}\right)^2 + \left(\frac{(p_{y1} - c_y)}{f}\right)^2 + 1}$$

$$r_2 = \sqrt{\left(\frac{(p_{x2} - c_x)}{f}\right)^2 + \left(\frac{(p_{y2} - c_y)}{f}\right)^2 + 1}$$

wherein $r_1$ is the first spatial ratio, $r_2$ is the second spatial ratio, $(p_{x1}, p_{y1})$ is the measuring position value of the first measuring pixel, $(p_{x2}, p_{y2})$ is the measuring position value of the second measuring pixel, (cx, cy) is the position value of the pixel of optical center, and f is the focal length of the depth sensing module.

10. The depth sensing method of claim 9, wherein calculating the first basic range in accordance with the first spatial ratio and the unit depth is performed by multiplying the unit depth by the first spatial ratio, and wherein calculating the second basic range in accordance with the second spatial ratio and the unit depth is performed by multiplying the unit depth by the second spatial ratio.

11. The depth sensing method of claim 10, wherein calculating the period number corresponding to the first measuring pixel and the second measuring pixel in accordance with the range value of the first measuring pixel, the range value of the second measuring pixel, the first basic range, the second basic range, and the period distance of the single-frequency modulated light is performed in accordance with following equation:

$$N = \frac{\left[R_{P1} - \left(\frac{r_2}{r_1}\right) \times R_{P2}\right]}{\left[\frac{(n_2 - n_1)}{1 + n_1}\right] \times P}$$

wherein N is the period number, $n_1=r_1-1$, $n_2=r_2-1$, $R_{P1}$ is the range value of the first measuring pixel, $R_{P2}$ is the range value of the second measuring pixel and P is the period distance.

12. The depth sensing method of claim 11, wherein calculating the first actual range value or the first actual depth of the first measuring pixel in accordance with the period number comprises:
calculating the first actual range value and the first actual depth of the first measuring pixel in accordance with following equations:

$$R_{A1} = N \times P + R_{P1}$$

$$D_{A1} = \frac{R_{A1}}{r_1}$$

wherein $R_{A1}$ is the first actual range value of the first measuring pixel, $R_{P1}$ is the range value of the first measuring pixel, N is the period number, P is the period distance, $D_{A1}$ is the first actual depth of the first measuring pixel and $r_1$ is the first spatial ratio.

13. The depth sensing method of claim 11, wherein calculating the second actual range value or the second actual depth of the second measuring pixel in accordance with the period number comprises:
calculating the second actual range value and the second actual depth of the second measuring pixel in accordance with following equation:

$$R_{A2} = N \times P + R_{P2}$$

$$D_{A2} = \frac{R_{A2}}{r_2}$$

wherein $R_{A2}$ is the second actual range value of the second measuring pixel, $R_{P2}$ is the range value of the second measuring pixel, N is the period number, P is the period distance, $D_{A2}$ is the second actual depth of the second measuring pixel and $r_2$ is the second spatial ratio.

14. A depth sensing system, comprising:
a depth sensing module configured to emit a single-frequency modulated light to a target object, and to obtain a sensed target data set in accordance with the single-frequency modulated light reflected from the target object, wherein the sensed target data set comprises pixel data and corresponding range data, the pixel data comprise a position value corresponding to a pixel of optical center of the depth sensing module and a measuring position value corresponding to a measuring pixel of the depth sensing module, and the range data comprise a range value corresponding to the pixel of optical center and a range value corresponding to the measuring pixel; and
a processor configured to perform:
calculating a period number corresponding to the measuring pixel, wherein calculating the period number corresponding to the measuring pixel comprises:
calculating a spatial ratio in accordance with the position value of the pixel of optical center, the measuring position value of the measuring pixel, and a focal length of the depth sensing module;
calculating a basic range in accordance with the spatial ratio and an unit depth, wherein the unit depth is the range value of the pixel of optical center;
calculating the period number corresponding to the measuring pixel in accordance with the range value of the measuring pixel, the basic range and a period distance of the single-frequency modulated light, wherein the period number in an integer greater than or equal to zero; and
calculating an actual range value or an actual depth of the measuring pixel in accordance with the period number.

15. The depth sensing system of claim 14, wherein the depth sensing module further comprises a sensor which is a pixel sensor array comprising a plurality of pixels, and the pixels of the pixel sensor array comprises the pixel of optical center and the measuring pixel.

16. The depth sensing system of claim 14, wherein calculating the spatial ratio in accordance with the position value of the pixel of optical center, the measuring position value of the measuring pixel, and the focal length of the depth sensing module is performed in accordance with following equation:

$$r = \sqrt{\left(\frac{(p_x - c_x)}{f}\right)^2 + \left(\frac{(p_y - c_y)}{f}\right)^2 + 1}$$

wherein r is the spatial ratio, (px, py) is the measuring position value of the measuring pixel, (cx, cy) is the position value of the pixel of optical center, and f is the focal length of the depth sensing module.

17. The depth sensing system of claim 16, wherein calculating the basic range in accordance with the spatial ratio and the unit depth is performed by multiplying the unit depth by the spatial ratio.

18. The depth sensing system of claim 17, wherein calculating the period number corresponding to the measuring pixel in accordance with the range value of the measuring pixel, the basic range and the period distance of the single-frequency modulated light is performed in accordance with following equation:

$$N = \frac{(R_P - r \times D)}{n \times P}$$

wherein N is the period number, n=r−1, $R_P$ is the range value of the measuring pixel, D is the unit depth and P is the period distance.

19. The depth sensing system of claim 14, wherein calculating the actual range value or the actual depth of the measuring pixel in accordance with the period number and the range value of the measuring pixel comprises:
    calculating the actual depth of the measuring pixel in accordance with following equation:

$$D_A = N \times P + D$$

wherein $D_A$ is the actual depth of the measuring pixel, N is the period number, P is the period distance and D is the unit depth.

20. The depth sensing system of claim 14, wherein calculating the actual range value or the actual depth of the measuring pixel in accordance with the period number comprises:
    calculating the actual range value of the measuring pixel in accordance with following equation:

$$R_A = r \times (N \times P + D)$$

wherein $R_A$ is the actual range value of the measuring pixel, r is the spatial ratio, N is the period number, P is the period distance and D is the unit depth.

* * * * *